United States Patent [19]

Elszasz

[11] 4,406,934

[45] Sep. 27, 1983

[54] APPARATUS FOR SENSING THE EXTENT OF TURNING OF A ROTATABLE PART

[75] Inventor: Rezso Elszasz, Budapest, Hungary

[73] Assignee: Olajterv Koolaj- es Gazipari Tervezo Vallalat, Budapest, Hungary

[21] Appl. No.: 263,021

[22] Filed: May 12, 1981

Related U.S. Application Data

[63] Continuation-in-part of Ser. No. 80,314, Oct. 1, 1979, abandoned, which is a continuation of Ser. No. 907,325, May 18, 1978, abandoned.

[30] Foreign Application Priority Data

May 18, 1977 [HU] Hungary .............................. KO 2860

[51] Int. Cl.³ .............................................. H01H 3/16
[52] U.S. Cl. ................................................. 200/61.39
[58] Field of Search .......... 200/61.39, 153 P, 153 PA, 200/47

[56] References Cited

U.S. PATENT DOCUMENTS

| | | | |
|---|---|---|---|
| 2,427,453 | 9/1947 | Hadley | 200/61.39 |
| 2,816,187 | 12/1957 | Smith | 200/61.39 |
| 2,913,544 | 11/1959 | Goddard | 200/153 P X |
| 2,920,156 | 1/1960 | Rice et al. | 200/61.39 |
| 3,233,053 | 2/1966 | Parks | 200/61.39 |
| 3,248,956 | 5/1966 | Kuhn | 200/47 X |

Primary Examiner—J. R. Scott
Attorney, Agent, or Firm—Young & Thompson

[57] ABSTRACT

Apparatus for sensing the extent of rotation of a rotatable part relative to a fixed part, comprises a pair of rings one of which is fixed and the other is rotatable, which define between them an annular space. Disposed in the annular space is a third ring carried by the rotatable ring, whose rotated position is sensed by a device carried by the fixed ring, by any of a variety of mechanisms, in a manner and to an extent such as indicates the degree of rotation of the rotatable part. At least one switch actuator is carried by the third ring and a switch device is carried by the fixed ring. The switch actuator also detects the extent of relative movement between the third ring and the fixed ring.

8 Claims, 30 Drawing Figures

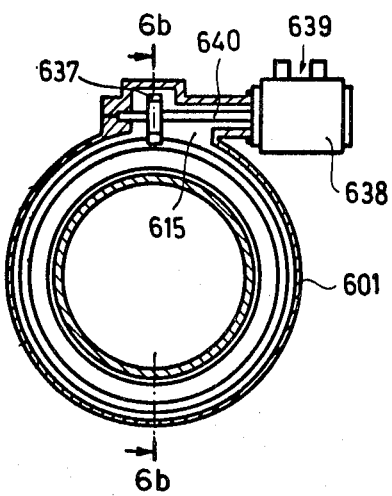
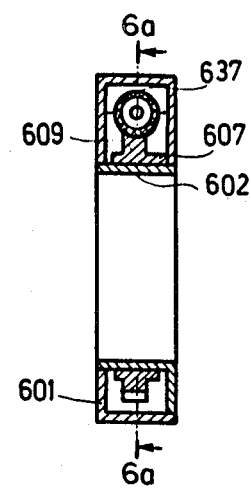
Fig. 6a
Fig. 6b
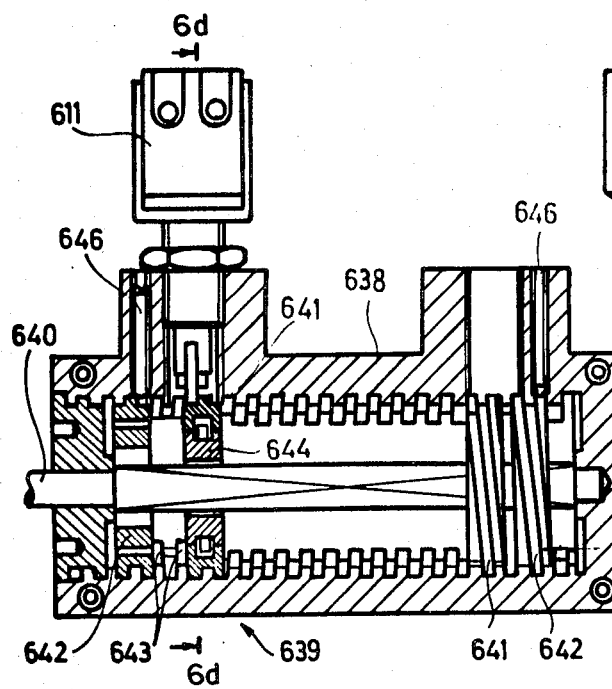
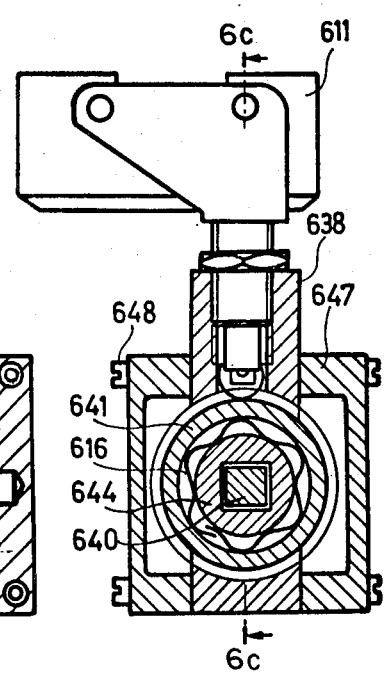
Fig. 6c
Fig. 6d

APPARATUS FOR SENSING THE EXTENT OF TURNING OF A ROTATABLE PART

CROSS REFERENCE TO RELATED APPLICATIONS

The present application is a continuation-in-part of copending application Ser. No. 80,314, filed Oct. 1, 1979 and now abandoned, which in turn was a continuation of Ser. No. 907,325, filed May 18, 1979 and now abandoned.

BACKGROUND OF THE INVENTION

The present invention relates to apparatus for sensing the motion of a rotating member and, depending on the momentary angular displacement, for sending a signal dependent on the rotated position of the part whose motion is sensed.

It is an object of the present invention to provide such apparatus, which will not require any significant alteration in the structure of the device whose rotating part is thus monitored.

It is known to provide such position-sensing devices for use, for example, in connection with rotary valves to send signals to a control center as to the closed, intermediate or open position of the valve and perhaps also to respond to signals received from the control center. This permits remote control of the valves. Such devices can embody limit switches to respond to the attainment of an end position by the valve rotor.

In a pipeline system, for example, there may be a number of valves whose opening and closing requires the intervention of an operator and so gives rise to the possibility of misadjustment. To avoid this, it is necessary to monitor the positions of the valves and to send signals to control equipment so as to initiate any required corrective action.

However, the sensors known heretofore require alteration of the internal construction of the device such as a valve, which is costly and requires special knowledge and skills. Moreover, such monitored devices are often authenticated and licensed mechanisms fitted with watertight and airtight and possibly explosion-proof packing, which must not be tampered with.

SUMMARY OF THE INVENTION

The present invention solves the above problems, by providing position-sensing and signalling apparatus which senses the extent of rotation of a rotating part of, for example, a valve, and which emits a signal responsive to the position of the rotating part, but which at the same time requires no important modification of the device to which it is applied.

To this end, the present invention is comprised by a pair of rings, one of which is adapted to be secured to the fixed part of the apparatus to be monitored and the other to the rotating part thereof, the rings between them defining an annular space. Provision is also made for the frictional rotative slipping of one ring relative to a third ring, to permit adjustment of the rings.

These and other features and advantages of the present invention will become apparent from a consideration of the following description, taken in connection with the accompanying drawings, in which:

DESCRIPTION OF THE DRAWINGS

FIG. 1b is a cross-sectional view of a device similar to that shown in FIG. 1a;

FIG. 2b is a section taken on the line 2b—2b of FIG. 2a;

FIGS. 4b, 4c and 4d are cross-sectional views taken on the lines 4b—4b, 4c—4c and 4d—4d, respectively, of FIG. 4a;

FIG. 5b is a top plan view of the device of FIG. 5a, with partial sectioning along the line 5b—5b of FIG. 5a;

FIG. 6a is a view of a sixth major embodiment of the invention, taken on the line b—b of FIG. 6b;

FIG. 6b is a cross-sectional view taken on the line a—a of FIG. 6a;

FIG. 6c is an enlarged cross-sectional detail of the device shown in FIGS. 6a and 6b, taken on the line c—c of FIGS. 6d and 6e;

FIG. 6d is a cross-sectional view taken on the line d—d of FIG. 6c;

FIG. 8b is a cross-sectional view taken on the line b—b of FIG. 8a;

DETAILED DESCRIPTION OF THE INVENTION

Figure 1A:
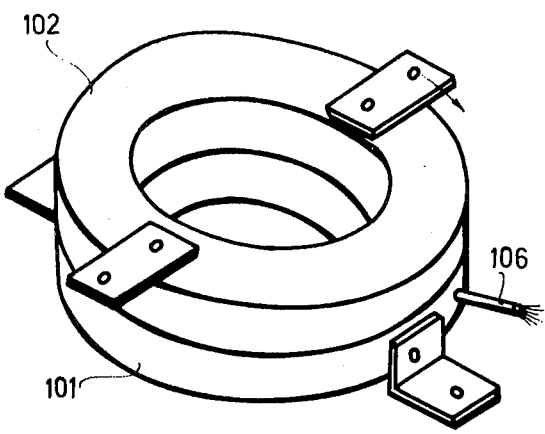
FIG. 1a is an outside perspective view of a first embodiment of the invention.

More detailed reference will now be made to the accompanying drawings; but before doing so, it should be explained that the reference numerals thereon bear a special relationship to the figure numbers and that the reference numerals used in the various figures bear a special relationship to the reference numerals used in the other figures. Specifically, it will be noted that all of the reference numerals are three-digit numbers. The first digit indicates the figure number, which might be considered to be a species number; while the second and third digits indicate the part within the figure and, among the various figures, identify corresponding elements. Thus, it is not necessary to identify every reference numeral in every figure, because the previous identification of such reference numeral in an earlier figure, plus the figure number itself, will adequately explain oherwise-unidentified reference numerals.

Referring now to the drawings in greater detail, and first to FIG. 1a, there is shown a perspective view of the device according to the present invention, comprising a first fixed ring 101 and a second rotary ring 102 which is fixed to the turning mechanism, the arrow showing one of the possible directions of rotation. The rings 101, 102 can bear against each other in one or several planes, and define between them an annular space.

Figure 1B:
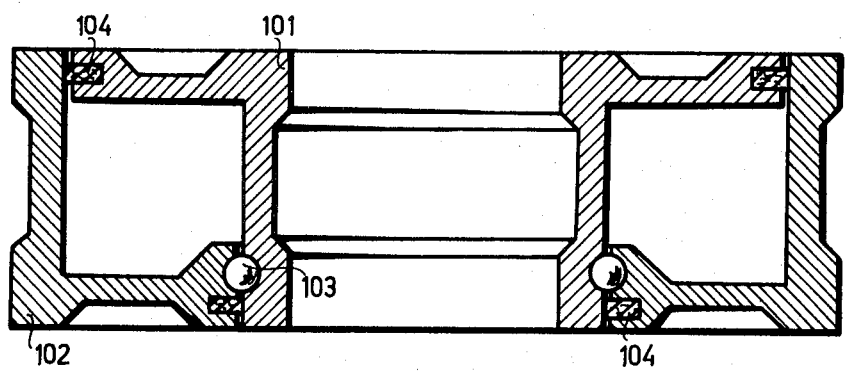

FIG. 1b shows a slightly modified version of the arrangement shown in FIG. 1a, on a larger scale and in cross section. The rotatable ring 102 is mounted on the fixed ring 101 through a bearing 103, which in the illustrated embodiment comprises ball bearings. Seals 104 render the joints between rings 101 and 102 watertight.

Figure 1C:
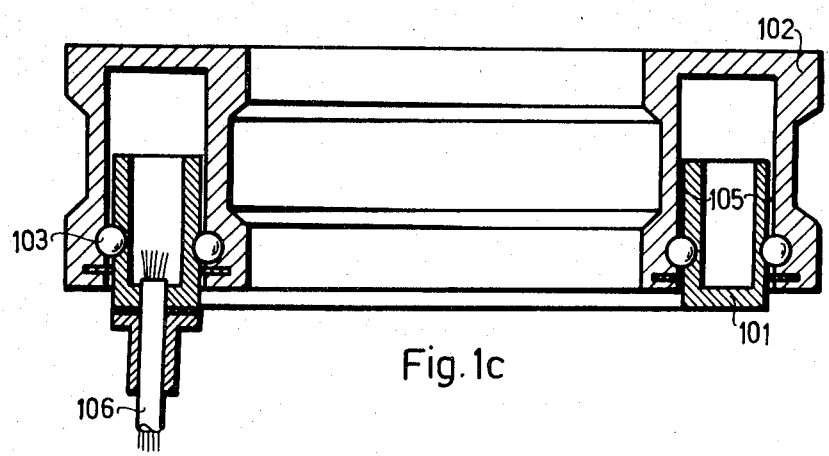
FIG. 1c is a view similar to FIG. 1b, but showing an explosion-proof modification thereof.

Another slightly modified version of what is shown in FIGS. 1a and 1b, is shown in cross section in FIG. 1c, in which the fixed ring 101 is provided with a flame arrester gap 105 such that the device is explosion-proof. Gap 105 prevents exit of the internal flame from the device upon the occurrence of an explosion. Notice also that, in FIG. 1c, the ball bearings 103 are on opposite sides of ring 101, which assists in resisting the force of an internal explosion.

An electric cable 106 is provided, for transmission of signals from structure for detecting relative rotation of rings 101 and 102. This structure is not shown in FIGS. 1a, 1b and 1c but will be shown and described in detail in connnection with the subsequent figures, it being understood that any embodiment of such structure disclosed hereinafter is adapted to be used with the constructions shown in 1a, 1b and 1c.

Figure 2A:
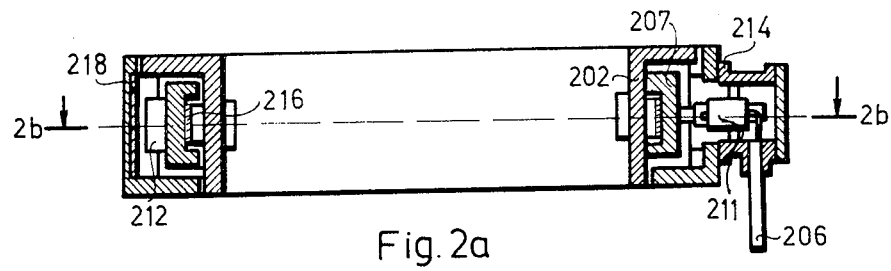
FIG. 2a is a view similar to FIG. 1b but showing a second embodiment of the invention, taken on the line 2a—2a of FIG. 2b.
Figure 2B:
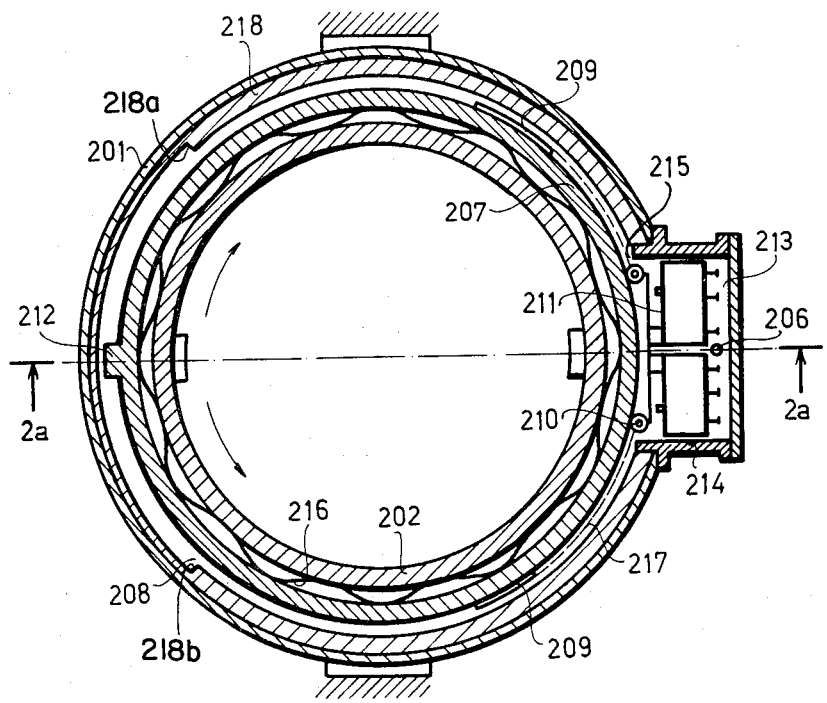
Figure 2C:
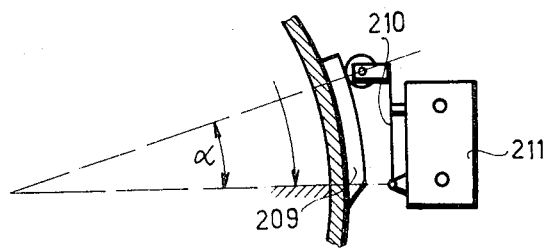
FIG. 2c is an enlarged detail of a cam-actuated switch forming a detail of FIG. 2b.

Turning now to FIGS. 2a, 2b and 2c, there is shown a fixed ring 201 and a rotary ring 202, there being a stationary ring 218 fixed to ring 201. A ring 207 is frictionally slip-coupled to rotary ring 202 by means of an undulating ring spring 216; and the rotary ring 207 has a detent 212 thereon that is adapted to rotate in the direction of either arrow in FIG. 2b in a gap 208 formed in ring 218, the ends of gap 208 being defined by abutment shoulders which define end or limit positions for detent 212. Gap 208 has an angular extent of about 90°.

It will of course be understood that the arrangement of the parts 202, 216, 207, 208, 212 and 218, comprises a self-setting arrangement particularly useful in ensuring that a valve will open by turning 90° from its closed position to a fully opened position, as is particularly useful in the case of a gate or butterfly valve. Thus, for example, upon a valve closing operation, the detent 212 will move in one direction or the other until it strikes the corresponding abutment 218a or 218b of ring 218 at one end or the other of recess 208. If the valve is not yet closed, then further turning movement of the valve, which is secured to rotary ring 202, will cause ring 202 to slip within ring 207 thanks to the frictional force of spring 216. Then, upon reverse or opening movement of the valve, the detent 212 will immediately move off the one abutment of ring 218 and swing through 90° until it strikes the other abutment at the other end of recess 208, at which time the valve opening movement will be halted with the valve turned precisely 90°. In other words, the precision of opening movement of the valve is automatically controlled by the frictional slippage of spring 216.

At the same time, an electrical signal corresponding to either or both of the end positions of ring 207 is sent via cable 206, thanks to the mechanism shown at the right of FIGS. 2a and 2b, and in FIG. 2c. Specifically, cams 209 are fixed to ring 207 at about 90° apart; and rollers 210 are carried by the fixed housing that includes fixed ring 201, so as to roll on the periphery of ring 207 about fixed axes. The rollers 210 extend through openings 215 through fixed ring 201. The cams 209 are movable along paths 217, into engagement with rollers 210 to move these rollers toward a signal converter unit 213 housed in a housing 214 therefor to close the corresponding switch to send a corresponding signal of the extent of rotary movement of the ring 207 and hence the rotary ring 202.

Another embodiment of mounting for roller 210 is shown is greater detail in FIG. 2c, in which it will be seen that contact between roller 210 and cam 209, upon rotation of cam 209 in the direction of the arrow in FIG. 2c, will close microswitch 211 and maintain microswitch 211 closed while ring 207 turns further through the angle $\alpha$ shown in FIG. 2c.

In FIGS. 3a–3d, a modification is shown in which the rotary ring 302 turns within the fixed ring 301 and is frictionally slip-connected by a spring 316 to a rotating ring 307. Ring 307 bears a cam 309, comparable to cams 209 in the preceding embodiment, but differing in that cam 309 is a single helical cam of almost 360° extent and bears the detent 312 whose possible range of movement is thus almost 360°.

A roller arm 310 having a roller 310a thereon extends through a gap 315 in fixed ring 301, and is urged against cam 309 by leaf spring 327. A switch lever 328 is mounted for swinging movement on the same shaft 328a as roller arm 310 but is urged away from roller arm 310 by a leaf spring 329. A switch segment 330 is arcuate about a center of curvature that coincides with the shaft on which switch arm 310 and switch lever 328 swing, and bears frictionally against a correspondingly curved surface of roller arm 310. Coil compression springs, whose compressive force is adjustable by means of the illustrated setscrews, yieldably urge switch segment 330 frictionally against roller arm 310. Claws on switch segment 330 limit the swinging movement of switch lever 328 away from roller arm 310.

Figure 3A:
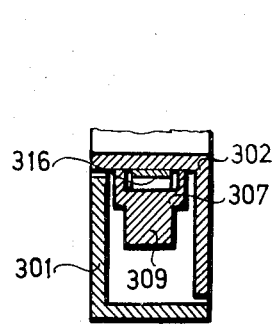
FIG. 3a is a cross-sectional view taken on the line 3a—3a of FIG. 3b.
Figure 3C:
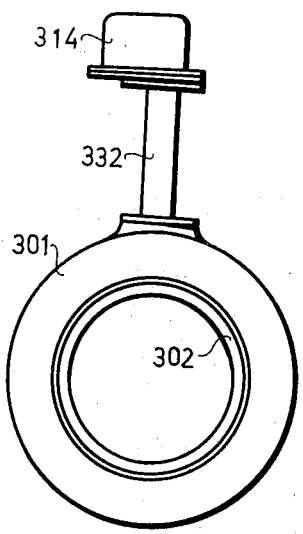
FIG. 3c is an exterior plan view of a slightly modified form of the device shown in FIG. 3b.
Figure 3B:
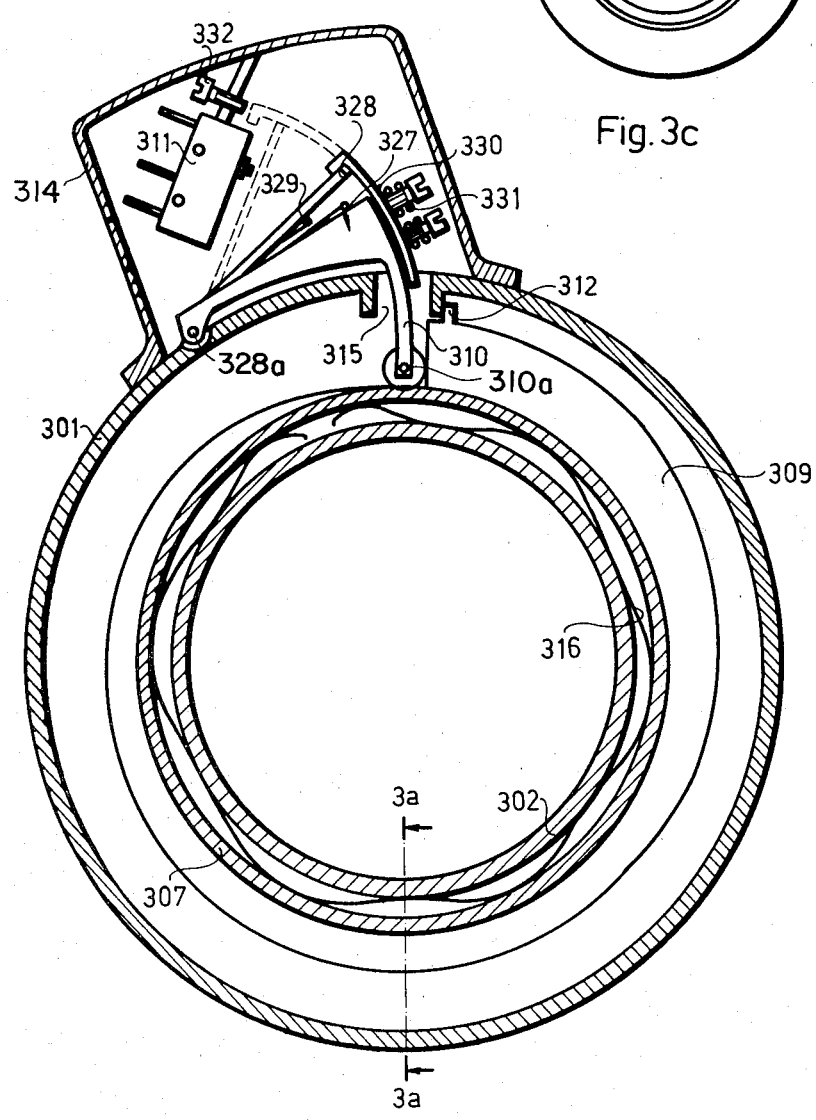
FIG. 3b is a sectional view of a third embodiment of the invention.

In operation, when ring 307 rotates in a clockwise direction as seen in FIG. 3b, the assembly 310, 310a, 327–331 is swung counterclockwise toward the phantom line position shown in FIG. 3b. When switch arm 328 contacts microswitch 311, the signal of the corresponding extent of rotation is given; but upon further rotation of ring 307, switch lever 328 remains against microswitch 311 but switch segment 330 can continue counterclockwise movement until it strikes adjustable setscrew 332. Any further rotation of member 307 is accommodated by slippage between 310 and 330, whose required frictional force is adjusted by adjustment of the springs 331 that are carried by roller arm 310 and extend through a bifurcation of switch segment 330. The end position of the parts represented by detent 312 in its clockwise rotated end position (the opposite end position from that shown in FIG. 3b) is thus characterized by switch segment 330 in abutment against setscrew 332, the parts thus being frictionally self-adjusting for this end position, just as parts 302 and 307 frictionally self-adjust under the frictional influence of spring 316. Naturally, the reverse rotation of ring 307 in a counterclockwise direction, results in the opposite movement of the parts until they resume their full line position shown in FIG. 3b.

FIG. 3c shows the possibility of extending the setscrew or stop member 332 a distance such that the microswitch housing 314 can be spaced from the fixed ring 301.

Figure 3D:
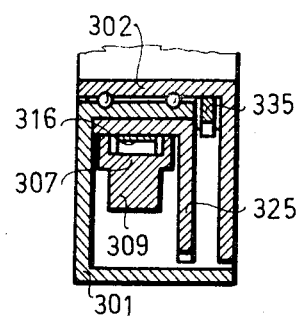
FIG. 3d is a view similar to FIG. 3a, but showing a modification thereof.
Figure 4D:
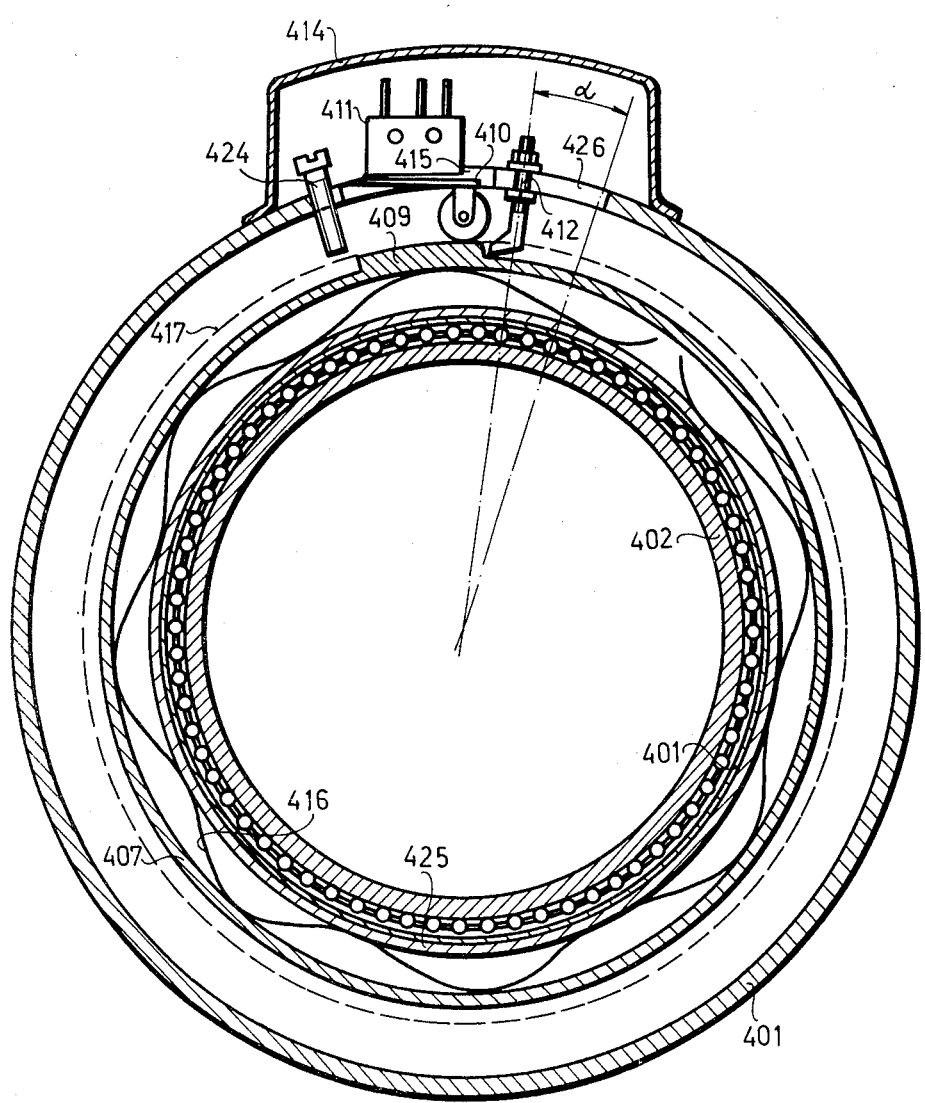
Figure 4A:
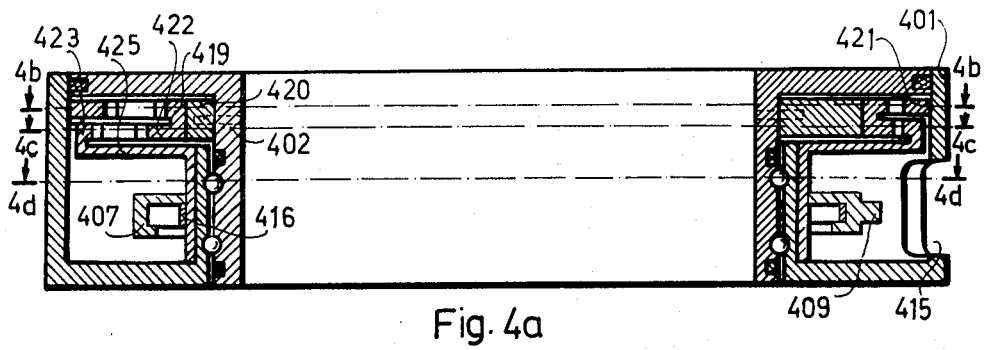
FIG. 4a is a view similar to FIG. 2a, but showing a fourth major embodiment of the invention.
Figure 4B:
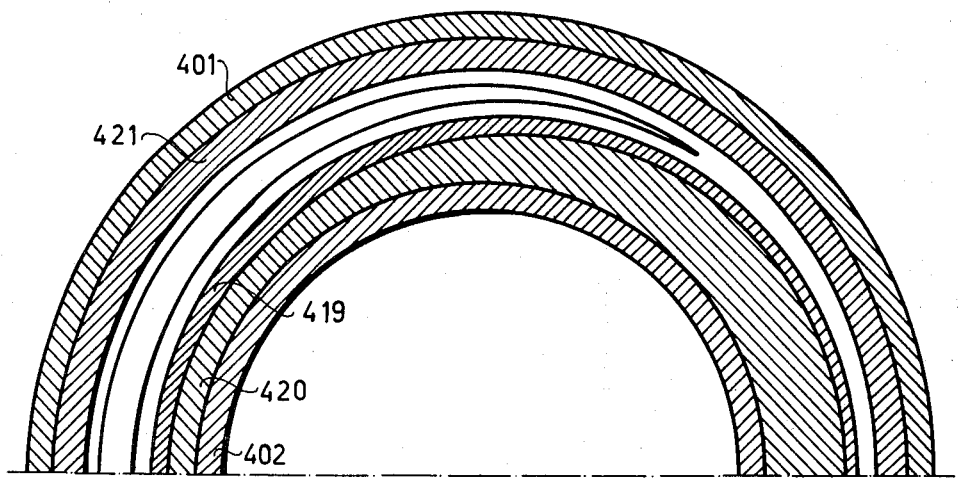
Figure 4C:
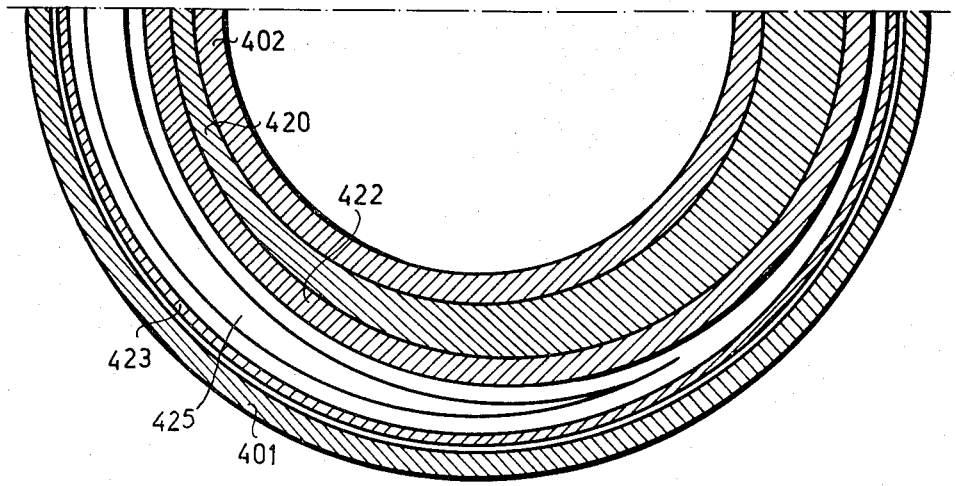

In FIG. 3d, the fixed ring 301 supports the rotary ring 302 for rotation thereon, rotary ring 302 having the possibility of being driven by the toothed drive ring 335 secured thereto. In this embodiment, however, the rotary ring 307 is not carried by ring 302 but rather by ring 335 which has a toothed gear wheel 325 thereon for engagement with drive gearing as in FIG. 5, the toothed wheel 325 being frictionally connected with ring 307 by spring 316 and in turn being frictionally engaged with fixed ring 301 for rotation relative thereto.

In the embodiment of FIGS. 4a–4d, the coupling element is an externally toothed epicycloidal wheel 419, rotatably supported by a bearing 420 with an external running surface, eccentrically arranged in relation to the rotational axis of the ring 407, and which is directly or indirectly coupled with the internally toothed gear 421 fixed to the fixed ring 401 whose pitch diameter is greater than that of the epicycloidal wheel 419 and on the outer plane of which is a pin which is connected to a further rotary part 425. The coupling of FIGS. 4a–4d is indirect, since the epicycloidal wheel 419 is connected with an internally toothed gear 423 coaxially fixed to a further rotary part 425 of greater pitch diameter, through an internally toothed further gear 422 arranged coaxially with the epicycloidal wheel 419 but with a different pitch diameter and different number of teeth than the epicycloidal wheel.

The further rotary part 425 is supported rotatably by a bearing coaxially fixed to the fixed ring 401. The rotary ring 407 is rotationally fixed to rotary part 425. Between ring 407 and the further rotary part 425 a wavy spring 416 is provided as a frictional slip coupling. Cam 409 is formed on the outer surface of ring 407. Roller arm 410 runs up on cam 409 to switch over the microswitch 411 in housing 414 at the end position in one direction of rotation or the other.

Slots 406 through fixed ring 401 frictionally retain detents 412 that engage with the shoulders of cams 409 in the end positions. Stop screws 424 for fixing the position of the parts are screwed through threaded holes in fixed ring 401 selectively to engage the other shoulder of cams 409.

The length of cam 409 and the position of detent 412 in slot 426, can be so selected that the roller of roller arm 410 remains lifted along the desired length of the contact angle.

It will be understood that the detent 412 in its preselected position, stops the cam 409 upon the first actuation of the device; while the rotary ring 402 may turn further until the end position, for example the closed position of the valve, is reached. The zeroing stop screws 424 are screwed into the stop position only when the ring 407 is brought into the first switch position. When both rings 407 are brought into the end position with these screws, then the screws are released and will be screwed in again only for a zeroing operation in connection with a possible new adjustment. If the ring 407 and cams 409 of a device such as a gate valve brought into an end position are set for the indication of the end position against the friction of the spring 416, then detents 412 no longer perform any function, unless the end position of the gate valve shifts as a result of wear, since in this case the detents shift the cam to a new end position, with the result that in the zero position the ring indicates both end positions.

Speed-reducing epicycloidal wheels of the type of FIGS. 4a–4d are known as such, and so need no further detailed description. Instead, the novelty of FIGS. 4a–4d is basically the same as in the other illustrated embodiments, in that rotary ring 402 with the eccentrically fixed bearing 420 rotates, for example to the left, together with the handwheel of a gate valve. The external teeth of the first epicycloidal wheels 419 turn in bearing 420 and are engaged at one point with the larger diameter internal teeth of the stationary wheel 421 fixed to the first stationary ring 401; and thus the eccentric epicycloidal wheel 419 lags behind by the difference of the number of teeth, so that it slowly rotates backward about its revolving eccentric shaft. The second epicycloidal wheel 422 fixed concentrically to the epicycloidal wheel 419 turning slowly to the right around its left-turning rotation axis, is engaged through its teeth at one point with the internal teeth of the rotary wheel 423 fixed concentrically on the further rotary part 425, thereby turning it to the right on the principle of a two-armed lever, provided that the diameter of wheel 423 is greater than that of wheel 421.

If the diameter of the pitch circle of 423 is selected to be smaller than the diameter of 421, an even greater but left-handed transmission ratio is obtained. Thus, by variation of the number of teeth, the reducing ratio can be selected within very wide limits.

The slot 415 on ring 401 and the path of motion 417 of cam 409, are functionally related to the apparatus in the same manner as the corresponding parts in FIG. 2b and so need not be described further.

Figure 5A:
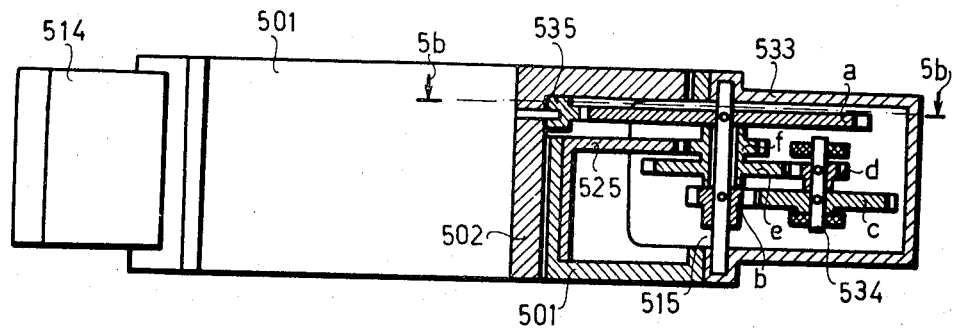
FIG. 5a is a partly sectioned side elevational view of a fifth major embodiment of the invention.
Figure 5B:
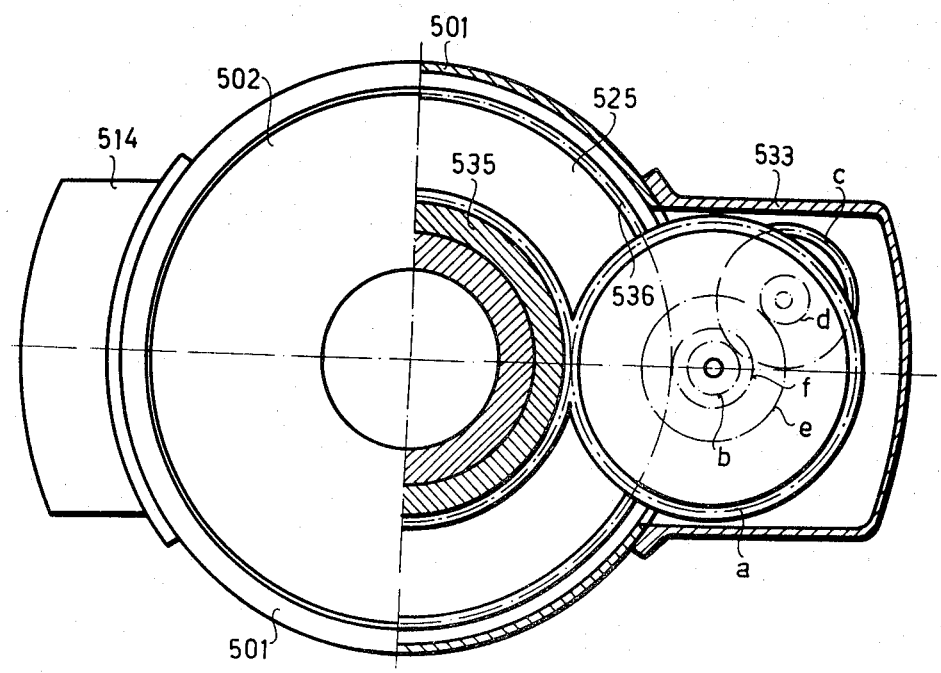

The embodiment of FIGS. 5a and 5b is similar to the preceding embodiments, except for the changeable gear unit 534 in housing 533 and the associated gearing. Thus, the fixed ring 501 is secured to a closed housing 514 containing the signal converter as before; while on the other side of the device is disposed the changeable gear 534 in its housing 533. A drive gear 535 is secured to the rotating ring 502, which through the toothed wheels of the gear transmission unit 534 drives a further rotary part 525 through the toothed wheel 536 fixed to it.

Thus, by changing the tooth wheels, several transmission ratios can be selected in the gear transmission unit 534. Thus, for example, the lowest transmission can be obtained by fixing the toothed wheels a–f to a common shaft. By omitting the transmission unit and rigidly coupling the rotary ring 502 and rotary member 525, turns smaller than 330° can be directly signalled.

The toothed wheels of transmission unit 534 are not marked with reference numerals other than the letters a–f, because according to the transmission requirement of the driving and driven toothed wheels 535 and 536, respectively, the number of the toothed wheels of the conventional transmission unit 534 and their diameter may differ. Of course, in FIG. 5a, reference numeral 515 refers to the recess through which the transmission gearing extends through ring 501.

Figure 6E:
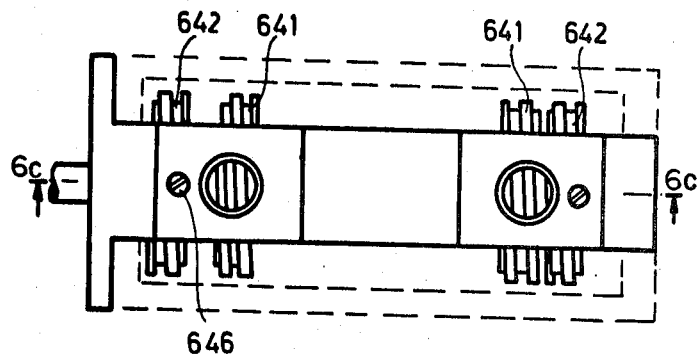
FIG. 6e is a fragmentary top plan view of what is shown in FIG. 6c.
Figure 6F:
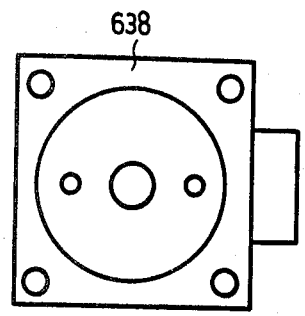
FIG. 6f is a left side view of what is shown in FIG. 6e.
Figure 6G:
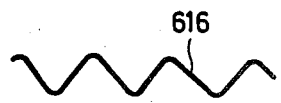
FIG. 6g is a view of a friction spring in its undistorted condition.
Figure 6H:
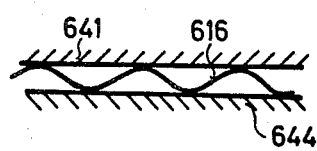
FIG. 6h is a view of a friction spring as in FIG. 6g, in its distorted condition, applied between two of the surfaces that can be seen in FIG. 6d.

Turning now to FIGS. 6a–6h, there is shown in FIG. 6a the fixed ring 601 with the recess 615 therein, through which extends a worm wheel 637 on worm wheel shaft 640 of the position indicator unit 639 which is carried by fixed ring 601.

As in the preceding embodiments, a ring 607 is frictionally carried by rotary ring 602 and has a toothed portion 609 thereon in mesh with worm wheel 637. The toothed portion 609 again fills the roll of giving the angular position, since the tooth or thread position represents the angular displacement of 607.

FIGS. 6c and 6d show the position indicator 639 in greater detail. As will be seen, this comprises a housing 638 in which is rotatably mounted the shaft 640 which, within the housing 638, has a square cross section as seen in FIG. 6d.

As will be seen from FIGS. 6c and 6d, two rotary members 644 are axially slidable on but constrained to rotation with the squared portion of shaft 640. Each member 644 is frictionally secured by a wavy spring 616 to a surrounding ring 641, these rings 641 in turn being screw-threadedly engaged with the internal screwthreading of housing 638. The rings 641, in turn, are provided with teeth 643 that are adapted to mate with corresponding teeth 643 on rings 642 that are rotatable in housing 638 in screw-threaded engagement with the internal screw threads thereof, but whose position can be selectively fixed by setscrews 646. The rings 642 thus do not turn with shaft 640 but rather fix end positions of the rings 641, 644, one at each end of the interior of housing 638.

Thus, the shaft 640 can be turned in one direction or the other, until the corresponding rings 644, 641, which are thus forced to rotate in the internal threads of housing 638, are moved in one direction or the other until they come into mating contact, with their teeth 643, with the ring 642 at the end of housing 638 toward which they move. This engagement determines end positions of the device, the same as did the detents in the previous embodiments. As before, microswitches 611 are adapted to register a predetermined end position and to give the corresponding signal.

In the cross section of FIG. 6d, it will be noted that covers 647 are provided as part of housing 638, which are detachably secured in assembly with screws 648, thereby to provide access for the manual adjustment of stop rings 642.

Figure 7:
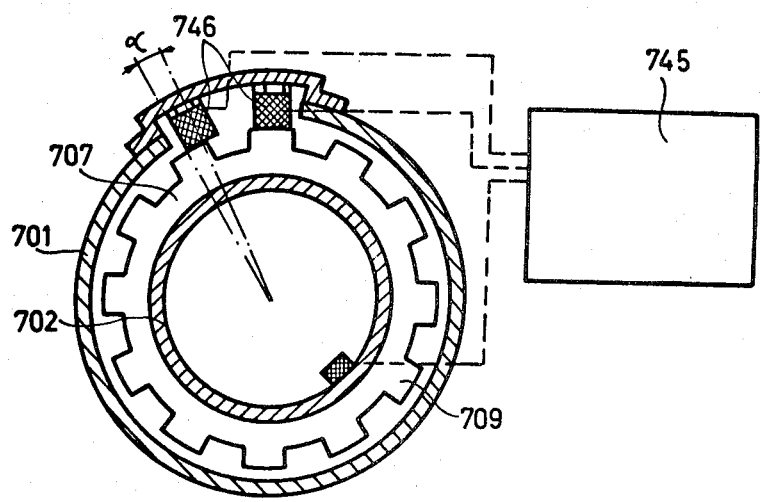
FIG. 7 is a view similar to FIG. 6a, but showing a seventh embodiment of the invention.

FIG. 7 shows diagrammatically another embodiment of the invention, in which rotary movement is inductively sensed and signalled. Thus, rotary ring 702 is in the form of a pole wheel 707 having ferro-magnetic poles 709. Inductive coils 746 are mounted on fixed ring 701, so that upon rotation of rotary ring 702, corresponding signals are sent to signal processing unit 745.

Figure 8A:
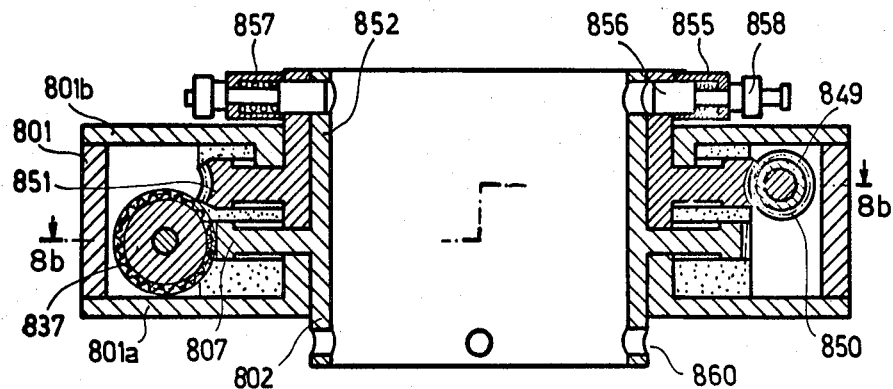
FIG. 8a is a cross-sectional view taken on the line a—a of FIG. 8b, showing an eighth major embodiment of the invention.
Figure 8B:
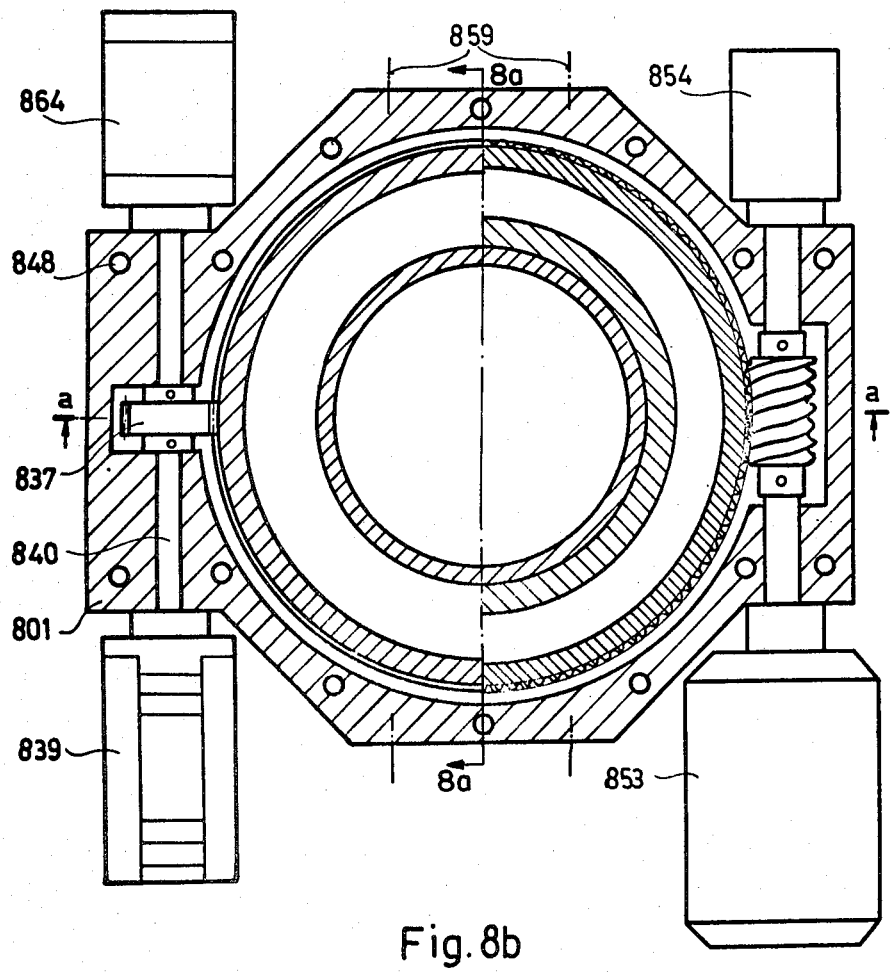

FIGS. 8a and 8b show a construction somewhat similar to that of FIG. 6. Thus, the rotary ring 802 has a worm-threaded ring 807 on it, which is in driving engagement with the worm wheel 837 of shaft 840 carried in bearings on fixed ring 801. Shaft 840 is in driving coupling with a position-indicator unit 839 at one end and on its other end rotates a conventional potentiometer or other continuous position transmitter 864.

Fixed ring 801 rotatably supports shaft 849 driven by motor 853, there being a worm thread on shaft 849 which meshes with a driven ring gear 851, this latter being selectively connectible to driving ring 852 which comprises the rotary ring 802. Rings 851 and 852 are selectively engageable by lock pins 856 that slide in housings 855 carried by ring 851 and that are urged radially inwardly by springs 857 in those housings, the pins 856 being selectively held in their outer or unlocking position as shown at the right of FIG. 8a, by screw-threaded adjusting nuts 858 which, when screwed radially inwardly, retain pins 856 in unlocked position and when screwed radially outwardly permit pins 856 to lock rings 851 and 852 together as shown at the left of FIG. 8a.

Figure 8C:
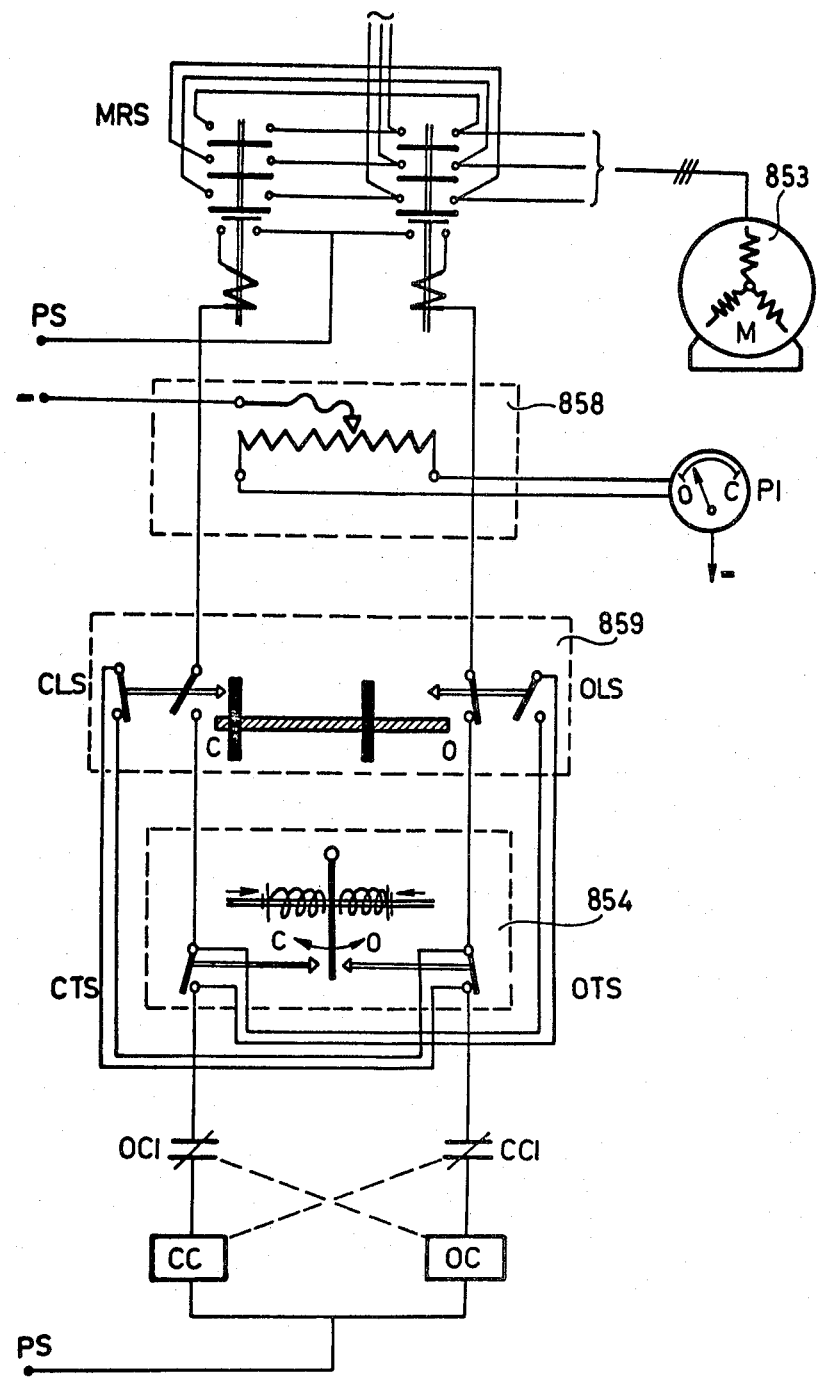
FIG. 8c is a circuit diagram of the device of FIGS. 8a and 8b, applied to the field of valve operation.

FIG. 8c is a schematic wiring diagram suitable for use with the construction of FIGS. 8a and 8b. The power supply PS supplies the control circuits. The closed contactor CC is locked from the open contactor OC; and a closed contactor interlock CCI is provided, as well as an open contactor interlock OCI. Thus, one of the switches can switch on only when the other is off. The torque switch reaching the end position receives overtorque and switches off the control circuit; while the other control circuit remains switched on.

The end position indicator with copying mechanism 859 opens the closed limit switch CLS in the predetermined end position and at the same time the open torque switch OTS is short-circuited. The control circuit actuates a three-phase direction switch, that rotates the motor 853 in one or the other direction.

The position-transmitter unit, e.g. a potentiometer, is independent from the control circuit. The control circuit may be hydraulically or pneumatically operated.

Figure 8D:
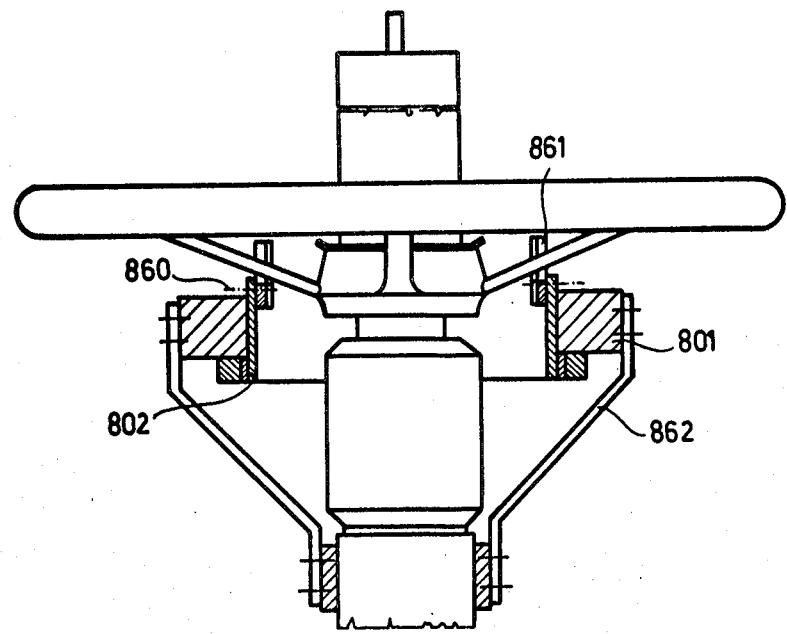
FIG. 8d is a somewhat schematic view of a first application of the device of FIGS. 8a and 8b to an industrial gate valve.

FIG. 8d shows the application of a device as in FIG. 8a and 8b, the brackets 862 being fixed to the upper part of the gate valve housing and supporting the fixed ring 801. Driving forks 861 are fixed on the rotary ring 802 with the driving screws 860 loosely engaging the handwheel spokes of the gate valve and thus in the case of retracting the lockpins 856, the handwheel drives the position-indicator ring or in the case of engaging in the pins 856 the actuator drives the handwheel.

Figure 8E:
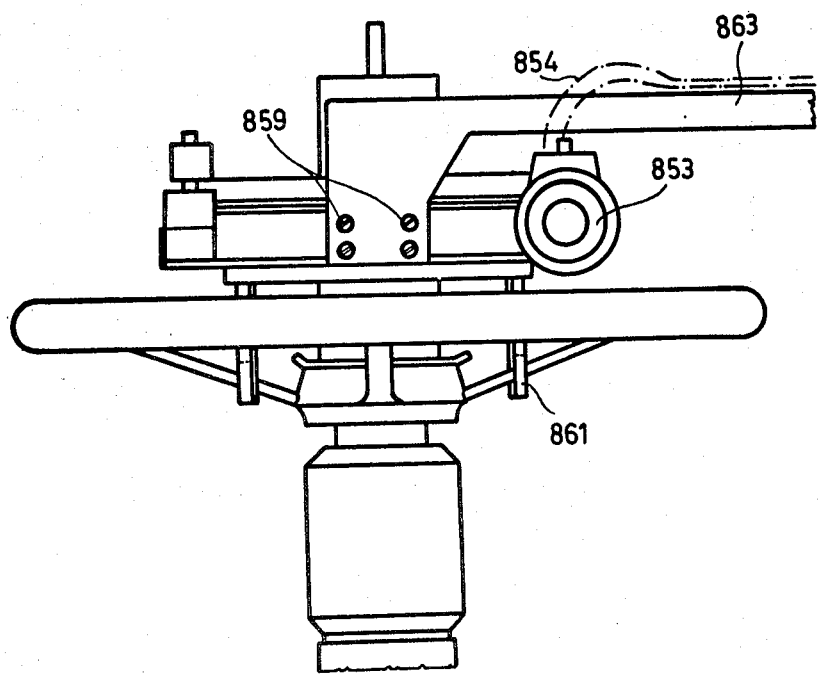
FIG. 8e is a view similar to FIG. 8d but showing another such embodiment of the same device.

In FIG. 8e, for the occasional actuation of the gate valve, the driving forks of the portable position indicator and actuator ring provided with handle 853 engage the spokes of the handwheel by placing the actuator over the handwheel. In the case of operation of the actuator, which is fixed with retaining screws 859 and universally applicable with handle 863, the handle 863 takes up the driving torque. The end of the handle is held by an operator and controlled by the push button on it. In this embodiment, the position-indicator unit 839 is disconnected and the connectors of the switches CLS and OLS shown in FIG. 8c are short circuited, since here only the torque switches CTS and OTS function.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for sensing the extent of rotation of a rotatable part, comprising a fixed ring, a rotatable ring carried by said fixed ring, said rings enclosing between them an annular space, a third ring carried by said rotatable ring for rotation in said annular space, at least one switch actuator means carried by said third ring in said space, and at least one switch means carried by said fixed ring and actuable by said at least one switch actuator means for detecting the extent of rotation of said third ring relative to said fixed ring.

2. Apparatus as claimed in claim 1, and sealing means disposed between said fixed and rotatable rings and sealing said annular space.

3. Apparatus as claimed in claim 1, and antifriction bearing means disposed between said fixed and rotatable rings.

4. Apparatus as claimed in claim 1, said fixed ring having a U-shaped cross section that opens inwardly toward said annular space.

5. Apparatus as claimed in claim 1, and a friction slip connection between said rotatable ring and said third ring, and abutment means for fixing a rotated end position of said third ring, whereby said third ring can strike said abutment means and stop while said rotatable ring can continue to rotate against the friction force of said friction slip connection.

6. Apparatus as claimed in claim 1, and a curved ring spring disposed between and frictionally interconnecting said third ring and said rotatable ring.

7. Apparatus as claimed in claim 1, and motor means for rotating said rotatable ring relative to said fixed ring.

8. Apparatus as claimed in claim 1, said switch actuator means comprising a helical cam that surrounds and is carried by said rotatable ring, said switch means including a cam follower that rides on said helical cam.

* * * * *